Feb. 4, 1958   H. C. GOLZ ET AL   2,822,231
EQUIPMENT ENCLOSURE STRUCTURE
Filed March 17, 1954   3 Sheets-Sheet 1
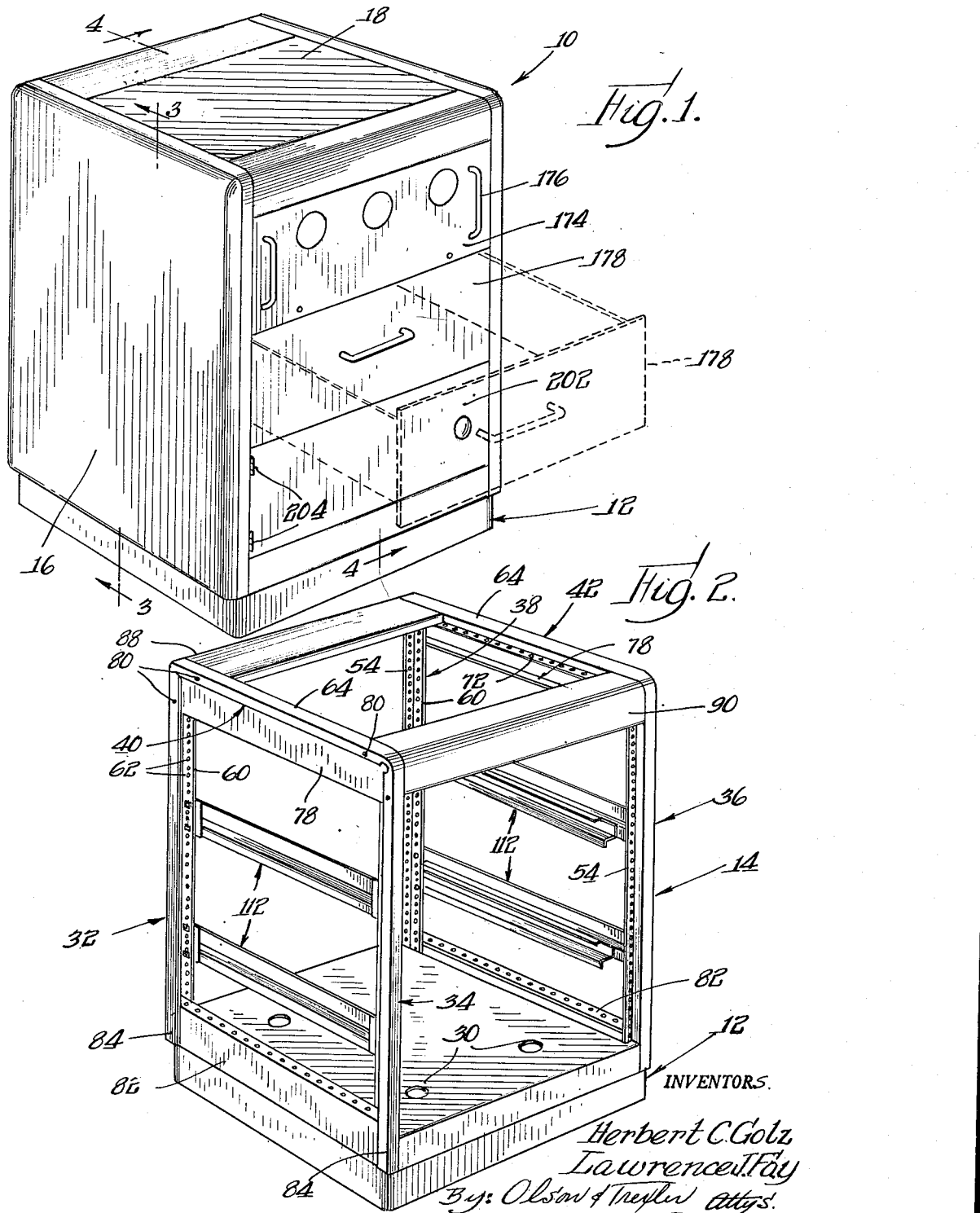

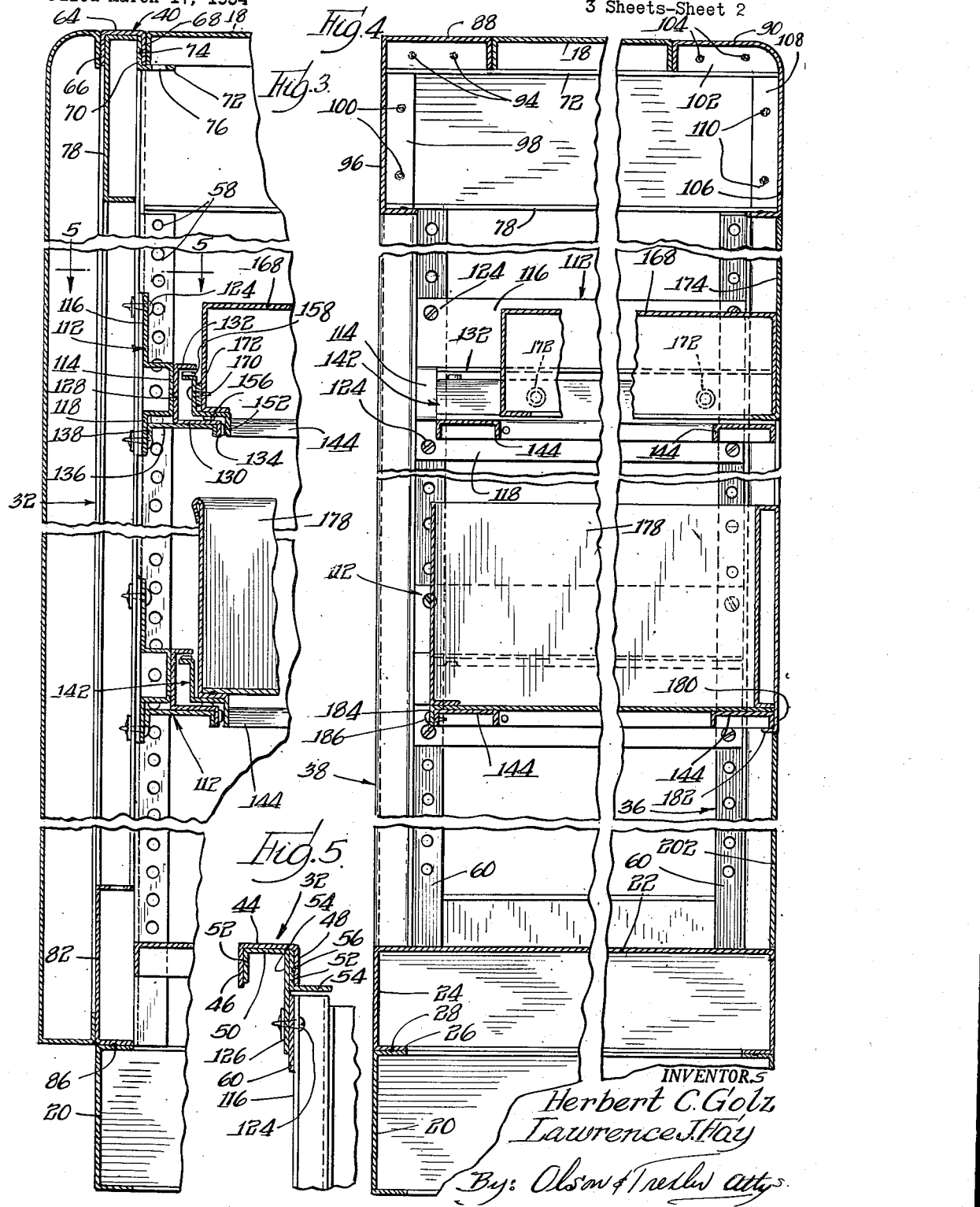

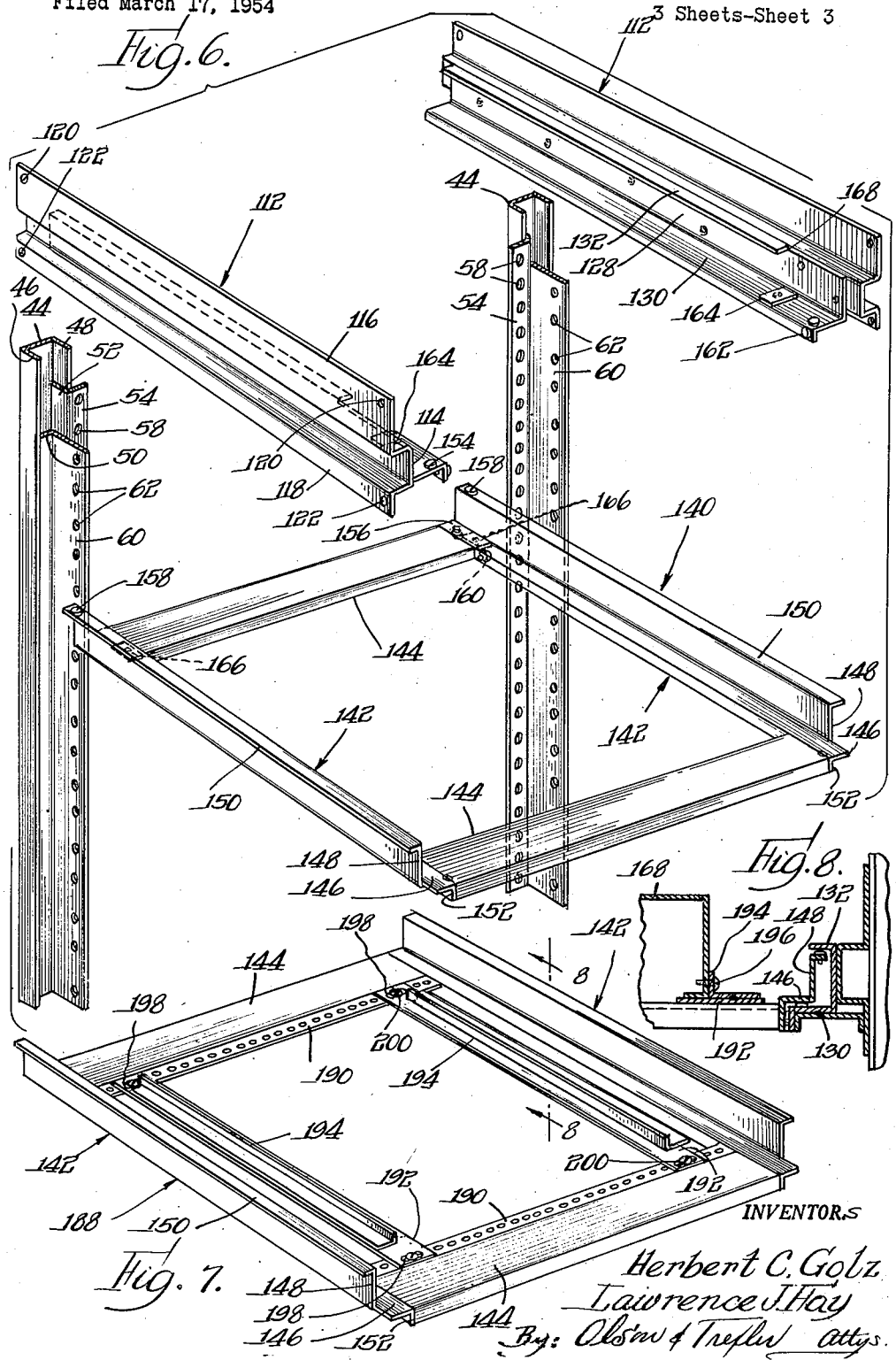

United States Patent Office 2,822,231
Patented Feb. 4, 1958

2,822,231
EQUIPMENT ENCLOSURE STRUCTURE

Herbert C. Golz, Aurora, and Lawrence J. Fay, Elgin, Ill., assignors to Elgin Metalformers Corporation, Elgin, Ill., a corporation of Illinois Application March 17, 1954, Serial No. 416,888

10 Claims. (Cl. 312—336)

The present invention relates to a novel enclosure or cabinet structure and more particularly a novel enclosure or cabinet structure especially adapted for receiving various types and sizes of equipment, such as medical, computing, transmission, supervisory data, radio, television or other electrical or control equipment.

Installations of equipment of the general types mentioned above differ widely and heretofore it has often been the practice to enclose such installations in cabinets custom built in accordance with the requirements of the particular installation. It is obvious that custom built enclosures or cabinets cannot be mass produced and are therefore relatively expensive. It is therefore an object of the present invention to provide a novel enclosure or cabinet structure which may be produced relatively economically and which may be easily adapted to the requirements of various equipment installations.

Another object of the present invention is to provide a novel enclosure or cabinet structure, which structure includes relatively simple and economical means for supporting various articles or pieces of equipment for movement into and out of the cabinet.

Still another object of the present invention is to provide a novel enclosure or cabinet structure of the type set forth in the preceding paragraph wherein the equipment supporting means may be easily adjusted to receive equipment of various sizes.

Still another object of the present invention is to provide a novel enclosure or cabinet structure of the above general type which is relatively strong and rigid while being of light and economical construction.

Other objects and advantages of the present invention will become apparent from the following description and the accompanying drawings wherein:

Fig. 1 is a perspective view illustrating a novel enclosure or cabinet embodying the principles of this invention;

Fig. 2 is a perspective view of the novel enclosure frame structure;

Fig. 3 is an enlarged fragmentary cross sectional view taken along line 3—3 in Fig. 1;

Fig. 4 is an enlarged fragmentary cross sectional view taken along line 4—4 in Fig. 1;

Fig. 5 is a fragmentary cross sectional view taken along line 5—5 in Fig. 3;

Fig. 6 is an enlarged fragmentary perspective view illustrating the novel enclosure frame structure in greater detail;

Fig. 7 is a perspective view illustrating a slightly modified form of a portion of the enclosure of this invention; and Fig. 8 is an enlarged fragmentary cross sectional view taken along line 8—8 in Fig. 7.

Referring now more specifically to the drawings wherein like parts are designated by the same numerals throughout the various figures, an enclosure or cabinet 10 embodying the principles of this invention is shown best in Figs. 1 and 2 and includes a base 12, a frame structure 14 and side panels 16 which may be applied to the opposite sides and back of the frame structure in any suitable manner. The upper end of the frame structure is closed by a top panel 18 which is preferably positioned so as to be substantially flush with the frame.

The base 12 is provided by a plurality of rectangularly arranged channel members 20 which are welded or otherwise connected together at the corners of the base. In addition, a panel member 22 overlies the channel members 20 to provide a bottom for the cabinet. The panel member 22 includes depending marginal sections 24 which terminate in inturned flanges 26 and these flanges are welded or otherwise secured to upper flanges of the channel members 20 as at 28. Preferably the bottom panel 22 is provided with one or more openings 30 of various sizes and shapes to accommodate electrical wires and cables when the cabinet is to be used for enclosing electrical equipment.

The frame structure 14 includes a plurality of vertical post assemblies 32, 34, 36 and 38 with the vertical post assemblies 32 and 34 being connected at their upper ends by a horizontal assembly 40 and the assemblies 36 and 38 being similarly connected by a horizontal assembly 42. As shown best in Fig. 2 each of the vertical post assemblies is disposed at one corner of the base 12 and the lower ends of the vertical post assemblies are welded or otherwise secured to the base.

As shown best in Figs. 3 and 5 the vertical post assembly 32 includes an outer channel member 44 having flanges 46 and 48 and an inner channel member 50 having flanges 52 and 54. In order to strengthen the post assembly and to provide means to which the back side panel may be secured, an angle member having a flange 52 and a flange 54 is provided. The flange 52 is disposed between the flanges 48 and 54 of the channel members and is secured to the flange 48 by a plurality of spot welds 56. The flange 54 of the angle member is provided with a series of apertures 58 through which any suitable fastening means, not shown, may be passed for securing the back side panel. The bottom end of the channel member 44 is welded or otherwise secured to the base 12 and in accordance with a feature of the present invention the inner channel member 50 is not welded or otherwise secured by fastening means to either the base or the outer channel member 44. Preferably the flanges of the channel members are inclined slightly inwardly so that the channel member 50 may be snapped into the channel member 44 and retained therein. By this structure the vertical corner post is relatively light in weight and has great strength and rigidity and at the same time it may be relatively easily assembled together. The flange 54 of the inner channel member has an extension 60 which is provided with a series of apertures 62 for a purpose set forth hereinbelow. The vertical posts 34, 36 and 38 include inner and outer channel members and angle members which are identical to the corresponding members of the post 32 as indicated by the reference numerals and, therefore, need not be described in detail.

As shown best in Fig. 3 the horizontal frame assembly 40 includes an outer channel member 64 having flanges 66 and 68 and an angle member having flanges 70 and 72. These members are substantially identical to the channel members 44 and angle members of the vertical post assemblies and thus the flange 70 is secured to the flange 68 by pluralities of spot welds 74 and the flange 72 of the angle member is provided with a series of apertures 76 for receiving fastening members such as screws, not shown, for mounting the top panel 18. The other horizontal frame assembly 42 is identical to the frame assembly 40 as indicated by the application of identical reference numerals to identical parts. The opposite ends of the horizontal channel members 64 are connected to and are preferably made integral with the outer channel members of the vertical post assemblies as shown best in Fig. 2.

In order further to rigidify and strengthen the portion of the frame structure provided by the vertical post assemblies 32 and 34 and the horizontal assembly 40, a channel member 78 extends between the vertical assemblies and within the horizontal assembly in the manner shown best in Figs. 2 and 3 and is spot welded to the outer channel members 44 and 64 as indicated at 80. Another channel member 82 which is similar to the channel member 78 extends between the lower ends of the vertical post assemblies and is welded to the outer channel members 44 as indicated at 84. In addition, the lower flange of the channel member 82 is preferably secured to the upper flange of the base channel member 20 by a plurality of spot welds 86 as shown best in Fig. 3. The opposite side of the frame structure is similarly strengthened and rigidified by channel members which are identical to the channel members 78 and 82 as indicated by the application of identical reference numerals thereto.

The basic frame structure 14 is completed by a pair of transverse frame members 88 and 90. The frame member 88 extends between the horizontal frame channel members 64 and has end flanges 92 heliarc welded to the horizontal channel members as at 94, see Fig. 4. In addition, the frame member 88 has a vertical portion 96 which extends between the outer channel members 44 of the vertical post assemblies 32 and 38, which vertical portion has end flanges 98 welded to the channel members 44 as at 100. The frame member 90 is similar to the member 88 and includes end flanges 102 which are heliarc welded as at 104 to the horizontal channel members 64 and a vertically extending portion 106 having end flanges 108 heliarc welded as at 110 to the outer channel members of the vertical post assemblies 34, and 36.

In accordance with an important feature of the present invention the cabinet structure is provided with easily adjustable means for supporting various pieces of electrical equipment such as a chassis for movement into and out of the cabinet or for supporting a drawer or various other articles and devices. This means includes a pair of track members 112 which are adapted to be adjustably arranged along opposite sides of the frame. Each of the track members includes a channel-shaped section 114 which is integral with upwardly and downwardly extending vertical flanges 116 and 118. The flange 116 is provided adjacent its opposite ends with apertures 120 and the flange 118 is provided with similar apertures 122. Each of these apertures is adapted to be aligned with one of the apertures 62 in the extensions 60 of the channel members 50 and screws 124 are inserted through the aligned apertures and retained by sheet metal nut-like members 126 for detachably mounting the track members. Each of the track members includes another channel member having a web portion 128 which is spot welded to the channel section 114 and horizontal vertically spaced flanges 130 and 132. In order to strengthen and rigidify the track member the flange 130 terminates in a downwardly extending marginal portion 134 and the web portion of another channel member 136 is spot welded to the flange 130 and a depending leg 138 of the channel member 136 is spot welded to the flange 118. This built up structure provides the track members with great strength and rigidity when considered in the light of the relatively small weight of sheet material stock used therein.

The supporting means further includes a cradle structure 140 which is slidably mounted on the track members. As shown best in Figs. 3, 4, 6 and 8 the cradle structure includes a pair of sheet metal side members 142 which are welded to and connected together by inverted transverse channel members 144. Each of the cradle structure side members 142 includes a horizontal section 146 adapted to overlie the flange 130 of one of the track members, and a vertical section 148 terminating in a horizontal flange 150 adapted to underlie the flange 132 of one of the track members. In addition, each of the side members 142 includes a flange 152 depending from the section 146 along the depending portion or flange 134 of one of the track members. With this structure it is seen that the cradle may slide on the flanges 130 of the track members to and from inner and outer positions and that the flanges 132 of the track members overlying the flanges 150 of the cradle will prevent the cradle from tipping when it is in its outer position or in other words when the cradle is in a position at least partially withdrawn from the interior of the cabinet.

In order to substantially reduce friction between the cradle structure and the track members and to provide for substantially noiseless operation of the cradle in a simple and economical manner, bearing members 154 are mounted on the forward or outer ends of the track member flanges 130 and similar bearing members 156 are mounted on and project beneath the rearward or inner ends of the cradle side member sections 146. In addition, similar bearing members 158 are mounted on and project above the inner ends of the cradle side member flanges 150 for engaging the track member flanges 132 and bearing members 160 are mounted adjacent the inner ends of the cradle side member flanges 152 for engaging the track member flanges 134. Additional bearing members 162 are mounted adjacent the forward end of the track member flanges 134 for engaging the depending cradle flange 152. These bearing members may be in the form of headed pins and may be constructed from any suitable material. It has been found that nylon is a desirable material for the bearing members. With the arrangement of bearing members just described direct contact between the cradle side members and the track member flanges is always prevented so that the cradle may slide easily into and out of the cabinet. Furthermore, the bearing members which provide a relatively snug fit between the cradle and the track members substantially reduce any possibility of any relative vibrating or jarring movement between the cradle and the track members, which movement might cause injury to electrical equipment supported on the cradle.

While the bearing members permit the cradle to slide easily they provide sufficient frictional resistance to such sliding movement so that the cradle will remain in any position to which it may be adjusted. Thus, the cradle may be partially withdrawn from the cabinet and it will remain in such partially withdrawn position but in order to prevent the cradle from being inadvertently or accidentally or completely removed from the cabinet positive stop means is provided. This stop means includes a small plate-like abutment member 164 which is spot welded to the flange 130 of at least one of said track members and a cooperating small plate-like abutment member 166 which is spot welded to the underside of at least one of the cradle side member sections 146. With this arrangement the members 164 and 166 will engage one another when the cradle has been pulled out to a substantially fully withdrawn position to prevent further removal. However, there are times when it is desirable to remove the cradle from the cabinet and in order to accomplish this the upper flanges 132 of the track members are cut away as shown best in Fig. 6 at 168 so that the cradle may be lifted sufficiently to enable the stop member 166 to pass over the stop member 164.

In accordance with the present invention the cradle structure 140 may be utilized to serve various needs. For example, the illustrated embodiment of the present invention has been provided with a pair of identical equipment or article supporting means including the track members and cradle member just described. On the upper cradle member a chassis 168 of any suitable piece of electrical equipment has been mounted. As shown in Fig. 3 the chassis may be secured to the cradle by one or more screws 170 which are threaded through suitable aligned apertures in the cradle side members and the chassis. Preferably a spacing block 172 is provided between the chassis and the cradle side member and the thickness of such spacing blocks may of course be varied in accordance with the width of the particular chassis to be mounted. The chassis 168 carries an instrument panel 174 to which handles 176 may be secured. The panel 174 also provides a front panel for the enclosure or cabinet as shown best in Fig. 1. The height of electrical equipment panels, such as the panel 174, is preferably determined in accordance with RTMA standards which require that dimensions of such panels vary in multiples of 1¾ inches. Therefore, the mounting apertures in the track members and the cooperating apertures in the cabinet frame structure are positioned so that the track members and cradle may be adjusted to accommodate any electrical panel constructed in accordance with the RTMA standards.

On the lower of the two illustrated cradles a drawer 178 may be mounted or, of course, another chassis for additional electrical equipment may be mounted. The drawer may be of any known sheet metal construction and in addition includes a depending front wall section 180 which terminates in an inturned flange 182 and a depending rear wall section 184. The drawer may be easily removably mounted on the cradle by hooking the flange 182 beneath the forward transverse cradle member 144 and by threading one or more screws 186 through suitable aligned apertures in the rear wall section 184 and the rear transverse cradle member 144.

In Figs. 7 and 8 there is illustrated a slightly modified form of the present invention wherein a cradle member 188 is better adapted to receive a narrow chassis of a piece of electrical equipment. The cradle 188 is identical to the cradle 140 as indicated by the application of identical reference numerals to identical parts except for the addition of adjustable mounting means adapted to receive a chassis or any other suitable or desired device. This mounting means includes perforated members 190 extending along each of the transverse members 144 and welded or otherwise secured in position. A pair of parallel longitudinally extending members 192 are supported between the transverse apertured members 190 and each of the members 192 has an angle member 194 spot welded or otherwise secured thereto. A chassis may be supported between the angle members 194 and secured to the upstanding flanges thereof by means of screws 196 as shown best in Fig. 8. The longitudinally extending members 192 are provided with elongated openings 198 at their opposite ends so that screw members 200 may be inserted therethrough and into an aperture in the perforated transverse members 190. By making the length of each elongated opening or slot 198 equal to the distance between apertures in the perforated members 190 it will be appreciated that the distance between the angle members 194 may be adjusted to receive a chassis of any width within the limits of the structure.

Referring to Fig. 1, it is seen that the instrument panel 174 and the drawer 178 provide front panels for the enclosure.

The remaining portion of the enclosure front may be provided by a door panel 202 which is supported by hinges 204. Of course, the door might be replaced by another instrument panel or drawer carried by a third cradle suitably mounted within the cabinet.

From the above description it is seen that the present invention has provided a novel enclosure or cabinet structure fully capable of accomplishing the objects heretofore set forth. More specifically, it is seen that the present invention has provided a basic cabinet structure which may be economically produced by mass production methods and which can be easily adapted to fit the requirements of the particular installation for which it is intended. In addition, it is seen that the present invention has provided a novel cabinet structure of great strength and rigidity while still being relatively simple and light in weight.

While the preferred embodiments of the present invention have been shown and described herein it is obvious that many structural details may be changed without departing from the spirit and scope of the appended claims.

The invention is claimed as follows:

1. An enclosure of the type described comprising means providing a chamber, substantially horizontally disposed track means located at opposite sides of said chamber, and cradle means extending between and slidably supported on the track means at opposite sides of said chamber for carrying a separate device such as an electrical equipment chassis or a drawer, each of said track means including a horizontally disposed outwardly facing channel member having a depending vertical flange connected with a side structure of said chamber means, a second horizontally disposed inwardly facing channel member having a vertical web section connected with a vertical web section of said first mentioned channel member, said second channel member having upper and lower horizontal inwardly extending flanges providing guides for said cradle means and a flange depending from an inner margin of said lower flange for cooperating with means on said cradle means to prevent lateral shifting of the cradle means, and a downwardly facing channel member disposed between and secured to said depending flanges.

2. An enclosure of the type described comprising means providing a chamber, substantially horizontally disposed track means arranged at opposite sides of said chamber, cradle means slidably supported by said track means, and means for mounting said track means for vertical adjustment so that said cradle means may carry devices of different sizes, said means for adjustably mounting said track means comprising a substantially vertical post structure providing a portion of a frame for the enclosure, said vertical post structure including an outer fixed channel member, and an inner channel member snugly received and retained within said outer channel member only by interengagement with the outer channel member, said inner channel member having a portion with a vertical row of apertures therein extending laterally from said outer channel member, which apertures are adapted to receive a fastener for mounting said track means.

3. An enclosure, as defined in claim 2, wherein each of said track means includes an outwardly facing channel member adjustably mountable, an inwardly facing channel member comprising a vertical web portion secured to said outwardly facing channel member, a relatively wide horizontal flange extending inwardly from a lower margin of said web portion, and a relatively narrow horizontal flange section extending inwardly from an upper margin of said web portion, said cradle means including side frame portions each comprising a relatively wide horizontal section and a relatively narrow horizontal section respectively overlying and underlying the wide and narrow flange sections of an associated track means, and cooperable flange means respectively depending from said track means lower flange sections and said cradle means side frame portions for preventing lateral shifting of the cradle means.

4. An enclosure, as defined in claim 3, wherein said cradle means includes means for connecting the cradle means to a separate device such as an electrical equipment chassis or drawer, which connecting means is adjustable to accommodate separate devices of different widths.

5. An enclosure, as defined in claim 4, wherein said connecting means includes spacing blocks of different widths adapted to be positioned along opposite sides of said cradle means for retaining separate devices of different widths therebetween.

6. An enclosure, as defined in claim 4, wherein said connecting means includes a member extending longitudinally of said cradle means for retaining said separate device, and means for adjusting said member transversely of said cradle means.

7. An enclosure, as defined in claim 6, wherein said means for adjusting said member includes means providing a row of apertures extending transversely of said cradle, and means providing an elongated opening in said member, which opening is in alignment with said row of apertures and is adapted to receive a fastener inserted therethrough and through one of said apertures.

8. In an enclosure structure of the type described a frame including a plurality of generally vertically extending post means arranged along opposite sides of an enclosure chamber, each of said post means having a first channel member with slightly inwardly inclined side flanges operatively interconnected with another of said post means and a second channel member snapped into and snugly received and retained within said first channel member, said second channel member of each of said post means including a perforated section extending laterally from said first channel member, support means disposed between said post means at opposite sides of the enclosure chamber, and means extending through the perforations in said sections for mounting said support means.

9. An enclosure structure, as defined in claim 8, wherein each of said perforated sections is provided with a vertically extending row of apertures, and said mounting means is adapted detachably to extend through said apertures to mount said support means for vertical adjustment.

10. An enclosure, as defined in claim 8, wherein each of said post means includes an angle member having one flange welded to said first channel member and a second laterally extending flange substantially perpendicular to said perforated section of said second channel member, said second flange having perforations therein adapted to receive fastening means for mounting a side panel to the frame.

References Cited in the file of this patent
UNITED STATES PATENTS

| | | |
|---|---|---|
| 431,485 | Rowland | July 1, 1890 |
| 917,870 | Jefferis | Apr. 13, 1909 |
| 947,842 | Ohnstrand | Feb. 1, 1910 |
| 1,288,010 | Isaac | Dec. 17, 1918 |
| 1,891,394 | Otte | Dec. 20, 1932 |
| 1,929,762 | Ulrich | Oct. 10, 1933 |
| 2,105,868 | Thomas | Jan. 18, 1938 |
| 2,498,807 | Hagenbach | Feb. 28, 1950 |
| 2,514,664 | Miller et al. | July 11, 1950 |
| 2,520,506 | Mankki | Aug. 29, 1950 |
| 2,620,251 | Restivo | Dec. 2, 1952 |